(12) United States Patent
Zamzow (10) Patent No.: US 8,866,051 B2
(45) Date of Patent: Oct. 21, 2014

(54) APPARATUS AND METHOD FOR APPLYING A PROTECTIVE ELEMENT ON AN OPTICAL WAVEGUIDE

(75) Inventor: Bert Zamzow, Gauting (DE)

(73) Assignee: CCS Technology Inc., Wilmington, DE (US)

( * ) Notice: Subject to any disclaimer, the term of this patent is extended or adjusted under 35 U.S.C. 154(b) by 2197 days.

(21) Appl. No.: 11/664,756

(22) PCT Filed: Oct. 4, 2005

(86) PCT No.: PCT/DE2005/001770
§ 371 (c)(1),
(2), (4) Date: Sep. 4, 2008

(87) PCT Pub. No.: WO2006/037309
PCT Pub. Date: Apr. 13, 2006

(65) Prior Publication Data
US 2010/0288751 A1    Nov. 18, 2010

(30) Foreign Application Priority Data
Oct. 5, 2004   (DE) .................. 10 2004 048 486

(51) Int. Cl.
| | | |
|---|---|---|
| *H05B 3/02* | (2006.01) | |
| *B29C 63/42* | (2006.01) | |
| *B29D 11/00* | (2006.01) | |
| *B29C 61/00* | (2006.01) | |
| *G02B 6/255* | (2006.01) | |
| *A45D 20/40* | (2006.01) | |

(52) U.S. Cl.
CPC .............. *G02B 6/2558* (2013.01); *B29C 63/42* (2013.01); *B29D 11/00663* (2013.01); *B29C 61/00* (2013.01)
USPC ............ 219/538; 219/201; 219/521; 392/407

(58) Field of Classification Search
USPC .......... 219/201, 385, 521, 535, 538; 392/407, 392/409, 411
See application file for complete search history.

(56) References Cited

U.S. PATENT DOCUMENTS

| | | | | | |
|---|---|---|---|---|---|
| 3,475,592 | A | * | 10/1969 | Berkl ............................. | 219/388 |
| 3,515,853 | A | * | 6/1970 | McAdams ..................... | 392/409 |
| 4,460,820 | A | * | 7/1984 | Matsumoto et al. .......... | 219/385 |
| 4,526,732 | A | * | 7/1985 | Kakii et al. .................... | 264/2.7 |
| 6,570,140 | B2 | * | 5/2003 | Karacsony et al. ........... | 219/521 |
| 6,818,864 | B2 | * | 11/2004 | Ptak .............................. | 219/390 |
| 7,133,606 | B1 | * | 11/2006 | Elliott et al. .................. | 392/411 |
| 2002/0088796 | A1 | * | 7/2002 | Karacsony et al. ........... | 219/521 |
| 2004/0026400 | A1 | * | 2/2004 | Ptak .............................. | 219/390 |
| 2005/0193690 | A1 | * | 9/2005 | Schoeneck ...................... | 53/557 |
| 2008/0047943 | A1 | * | 2/2008 | Burton .......................... | 219/201 |

\* cited by examiner

*Primary Examiner* — Shawntina Fuqua
(74) *Attorney, Agent, or Firm* — Dinsmore & Shohl, LLP (57) ABSTRACT

A device and a method are provided, for shrinking a protective element (101) shrinkable by means of the supply of heat onto an optical waveguide (100). The method involves generating thermal radiation, reflecting it and focusing it onto a focus zone in which the protective element (101) is held. The device contains a heating element (10), which generates thermal radiation, a reflector (30), which focuses the thermal radiation emitted by the heating element onto the focus zone, and a mount (20), by means of which the protective element (101) can be held in the focus zone.

29 Claims, 6 Drawing Sheets

025
APPARATUS AND METHOD FOR APPLYING A PROTECTIVE ELEMENT ON AN OPTICAL WAVEGUIDE

The invention relates to a device and a method for fitting a heat-shrinkable protective element onto a section of an elongated element, in particular of an optical waveguide.

BACKGROUND OF THE INVENTION

In order that optical waveguides can be welded to one another by means of fusion welding, for example, the optical waveguides are uncovered in the vicinity of the locations to be welded. For this purpose, fiber coatings surrounding the optical waveguides are removed. After the optical waveguides have been welded to one another, for example, they are protected against ambient influences and mechanical damage. Protection for an exposed optical waveguide may also be necessary for other reasons.

A protective element shrinkable by means of the supply of heat is usually used for protecting a previously uncovered optical waveguide. The protective element is embodied as a tube made of a material shrinkable by means of the supply of heat, for example a polymer. The protective element is pushed over a section of the optical waveguide that surrounds the uncovered part, and is then heated. The heating brings about heat-shrinking of the protective element. After the heat shrinking, that section of the optical waveguide which surrounds the uncovered part is closely enclosed by the protective element. Furthermore, the protective element can adhere to the surface of the uncovered optical waveguide. The desired protection against ambient influences and mechanical damage is achieved in this way.

In order to heat a protective element shrinkable by means of the supply of heat, use is made of a so-called shrinking furnace. The shrinking furnace usually contains a trough with a u- or v-shaped channel for receiving the protective element and a heating element for heating the trough.

A conventional shrinking furnace has the disadvantage that the heat from the heating element is transferred to the protective element by thermal conduction via the trough and by convection via the air. Due to this indirect transfer of the heat from the heating element to the protective element, the temperature of at least one part of the trough and the temperature of at least one part of the air are always above the temperature of the protective element. The trough and the air in each case have a considerable thermal capacity. Therefore, a large part of the thermal output generated by the heating element is consumed for heating the trough and the air. Moreover, only a small part of the surface of the trough and a small part of the surface of the protective element touch one another. As a result, only small quantities of heat per unit time can be transferred directly from the trough to the protective element by thermal conduction.

Shrinking furnaces and corresponding fusion welding apparatuses which are supplied with power by means of batteries or accumulators are produced for mobile use. However, the conventional shrinking furnace wastes a considerable amount of the generated energy for heating the heating element, the trough and the air. This energy is no longer available for shrinking on protective elements or carrying out welding operations. Consequently, the number of shrinking-on and welding operations that can be carried out with a battery or accumulator charge is dramatically reduced.

In order to transfer the required quantity of heat to the protective element, the conventional shrinking furnace requires a corresponding time period. Approximately 45 seconds are required for the heating-up phase, in which the heating element, the trough, the air and the protective element assume the temperature necessary for initiating the shrinking-on. Approximately 45 seconds are also required for the shrinking-on phase, in which the protective element takes up, the thermal energy required for the shrinking-on process. The power consumption of the shrinking furnace is about 20 W during the heating-up phase and about 15 W during the shrinking-on phase. Accordingly, this results in an energy consumption of 900 Ws for the heating-up phase, an energy consumption of 675 Ws for the shrinking-on phase and a total duration of the shrinking-on operation of approximately 90 seconds.

Overall, it can be stated that the energy consumption and the time expended for shrinking a protective element onto an optical waveguide using a conventional shrinking furnace are unnecessarily high.

Accordingly, the object of the invention is to specify a device and a method for the rapid and energy-saving shrinking of protective elements onto elongated elements such as optical waveguides.

GENERAL DESCRIPTION OF THE INVENTION

The device according to the invention for shrinking a protective element shrinkable by means of the supply of heat onto an elongated element, in particular an optical waveguide, comprises a heating element, adapted to emit thermal radiation, a mount, adapted to hold the protective element, and a reflector, adapted to reflect the radiation emitted by the heating element and focusing it onto the protective element.

The transfer of the heat from the heating element to the protective element is effected by thermal radiation. The thermal radiation is emitted by the heating element, focused onto the protective element by the reflector and predominantly absorbed by the protective element. Given a suitable choice of the wavelength emitted by the heating element, the material for the reflective area of the reflector and the material for the protective element, it is possible to minimize the power loss due to heating of the reflector and the air within the device. As a result, for shrinking a protective element onto an optical waveguide, a lower thermal output and correspondingly a lower electrical power consumption than in the case of a conventional shrinking furnace are required. Moreover, the protective element more rapidly reaches a temperature at which the heat shrinking commences and the quantity of heat required for the shrinking process can be supplied in a shorter time. Therefore, with a limited supply of energy, it is possible for a higher number of protective elements to be shrunk onto optical waveguides in a shorter time.

The protective element preferably extends in a longitudinal direction. The heating element preferably extends parallel to the protective element in the longitudinal direction and emits the thermal radiation predominantly uniformly in all directions perpendicular to the longitudinal direction.

The reflector preferably has a reflective area which extends in the longitudinal direction and whose cross sections perpendicular to the longitudinal direction have the form of ellipses.

The material for the reflective area of the reflector is to be chosen such that the thermal radiation emitted by the heating element is predominantly reflected and absorbed as little as possible at the reflector. The reflective area is coated with gold, by way of example.

Since one of the ellipses in each case has a first focal point and a second focal point, a first zone is defined by the first focal points of the ellipses and a second zone is defined by the second focal points of the ellipses. The heating element preferably extends along the first zone and the protective element preferably extends along the second zone.

The heating element preferably comprises a wire made of an electrically conductive material which predominantly emits thermal radiation if electric current flows through it.

The heating element preferably contains a longitudinal section lying opposite the protective element and divided into end regions and a central region arranged in between, the cross section of the wire having a tapering in the central region.

The wavelength best suited to the absorption of the thermal radiation by the protective element and the associated heating of the protective element changes depending on materials chosen for the protective element. The wavelength predominantly emitted by the wire can be controlled by way of the resistance of the wire and the electrical voltage applied to the wire. An optimum combination of the electrical resistance of the wire and the voltage applied to the wire can thereby be chosen for different materials from among the materials.

The wire preferably contains a metal or an alloy and the wire particularly preferably contains an alloy composed of iron, nickel and aluminum. Furthermore, the wire is preferably coiled in the form of a helix.

The heating element preferably contains a longitudinal section lying opposite the protective element and divided into end regions and a central region arranged in between, a pitch of the helix having a smaller value in the central region than in the end regions. The turns of the helix are arranged more densely in the central region than in the end regions.

The heating element preferably comprises a carrier element and the wire is preferably wound as a coil onto the carrier element. The carrier element may contain ceramic, by way of example. The heating element can preferably be removed from the device.

The reflector preferably comprises a first part and a second part, which are movable relative to one another. The first part is connected to the second part via a hinge, for example, such that the reflector can be swung open. The first part can also be detachable from the second part.

The device preferably comprises a cooling fan for generating an air stream around the protective element.

The mount preferably comprises bearing areas, between which a section of the optical waveguide which is surrounded by the protective element can be mounted in such a way that the thermal radiation is focused onto the protective element.

The heating element may also comprise a radiator, which emits the radiation predominantly in a preferred direction. The radiator may comprise for example an infrared-light-emitting diode or an entire array of infra-light-emitting diodes. The radiator may also comprise a semiconductor laser.

The device according to the invention preferably comprises an optical arrangement for expanding a beam bundle of the thermal radiation emitted by the radiator.

The protective element preferably extends in a longitudinal direction. The reflector may have a reflective area which extends in the longitudinal direction and whose cross sections perpendicular to the longitudinal direction have the form of parabolas. One of the parabolas in each case has a focal point and the focal points of the parabolas define a first zone in which the protective element is arranged.

The device according to the invention may comprise an optical arrangement which can be displaced in the longitudinal direction or can be oscillated about an axis perpendicular to the longitudinal direction in order to deflect a beam bundle of the thermal radiation emitted by the radiator in a time-dependent manner and to distribute it over the protective element extending in the longitudinal direction.

Preferably, the protective element is divided in the longitudinal direction into end regions and a central region arranged in between, and a residence duration of the beam bundle is higher in the central region than in the end regions.

The method according to the invention for shrinking a protective element shrinkable by means of the supply of heat onto a section of an optical waveguide comprises a step of providing the optical waveguide and of a protective element surrounding a section of the optical waveguide, a step of emitting thermal radiation, a step of reflecting the thermal radiation, a step of focusing the thermal radiation onto the protective element, and a step of heating and resultant shrinking the protective element onto the section of the optical wave guide.

The step of reflecting the thermal radiation preferably comprises the step of focusing the thermal radiation.

The step of focusing the thermal radiation onto the protective element preferably comprises a step of focusing the thermal radiation onto a zone extending in a longitudinal direction.

The step of emitting thermal radiation preferably comprises emitting radiation in all directions perpendicular to a longitudinal direction.

The step of focusing the thermal radiation preferably comprises generating a higher temperature in a central region of the protective element, said central region being arranged between end regions at a lower temperature.

DESCRIPTION OF EXEMPLARY EMBODIMENTS WITH REFERENCE TO THE FIGURES

Figure 1:
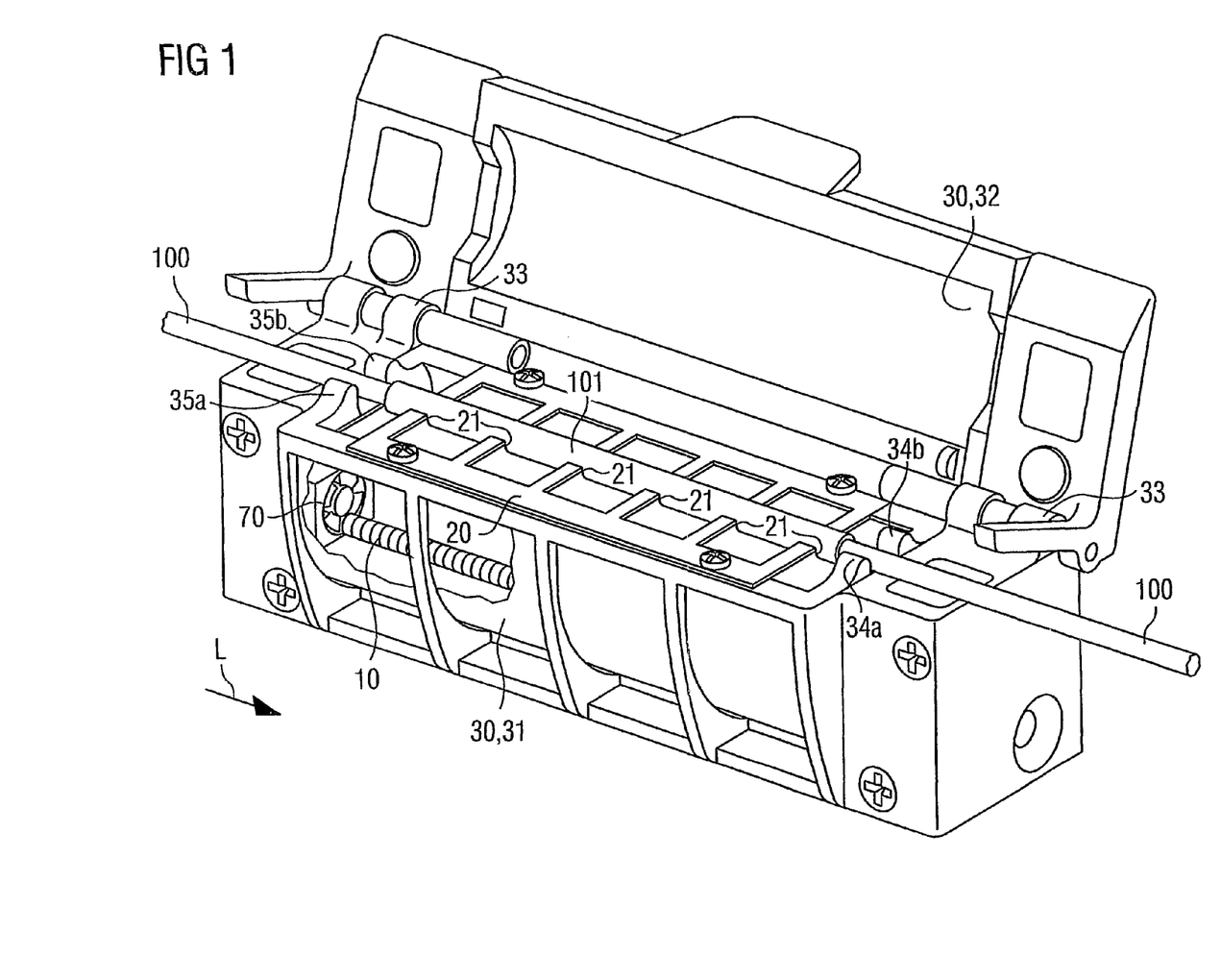
FIG. 1 shows an exemplary embodiment of the device for fitting a heat-shrinkable protective element in accordance with the present invention.

FIG. 1 perspectively illustrates an exemplary embodiment of the device according to the invention for shrinking a protective element 101 onto an optical waveguide 100.

The device comprises a heating element 10, a mount for the optical waveguide 100 and a reflector 30, which are accommodated in a common housing, for example comprised of injection molding or plastic material. The protective element 101 surrounds a section of the optical waveguide 100. The optical waveguide 100 and the protective element 101 surrounding it extend in a longitudinal direction L.

The reflector 30 extends in the longitudinal direction L over a specific length, is embodied as a hollow body and is integrated into the housing. The reflector 30 comprises a reflective area having identical cross sections in the form of ellipses over the entire length of the reflector 30 with regard to the longitudinal direction L. One of the ellipses in each case has a first and a second focal point. A first focus zone is defined by the first focal points of the ellipses and a second focus zone is defined by the second focal points of the ellipses. The first focus zone contains the first focal points and the second focus zone contains the second focal points of the ellipses. The reflective area 301 is applied as a coating onto the inner lateral surface of the reflector 30.

The housing comprises a lower part and an upper part arranged thereon as a movable cover. The reflector 30 comprises a first part 31 and a second part 32. The first part 31 of the reflector comprises the larger part of the reflector 30 and is integrated into the lower part of the housing. The second part 32 comprises the smaller part of the reflector 30 and is integrated into the upper part of the housing that is provided as a cover. In the example shown, the upper part of the housing, which contains the second part 32 of the reflector 30, is fixed in a rotatable manner by means of hinges 33 to the lower part of the housing, which contains the first part 31 of the reflector 30. The reflector 30 can therefore be swung open in order to obtain access to the mount 20. It is also conceivable for the second part 32 only to be plugged onto the first part and therefore to be completely removable from the first part 31. If the first part 31 and the second, upper part 32 of the housing are connected to one another and closed, they surround a cavity lined by the reflector. The reflector is formed from a material that reflects thermal radiation as well as possible. By way of example, this may be a vapor-deposited or deposited reflective material. The material is preferably metallic; the reflector is particularly preferably formed from gold.

Figure 6:
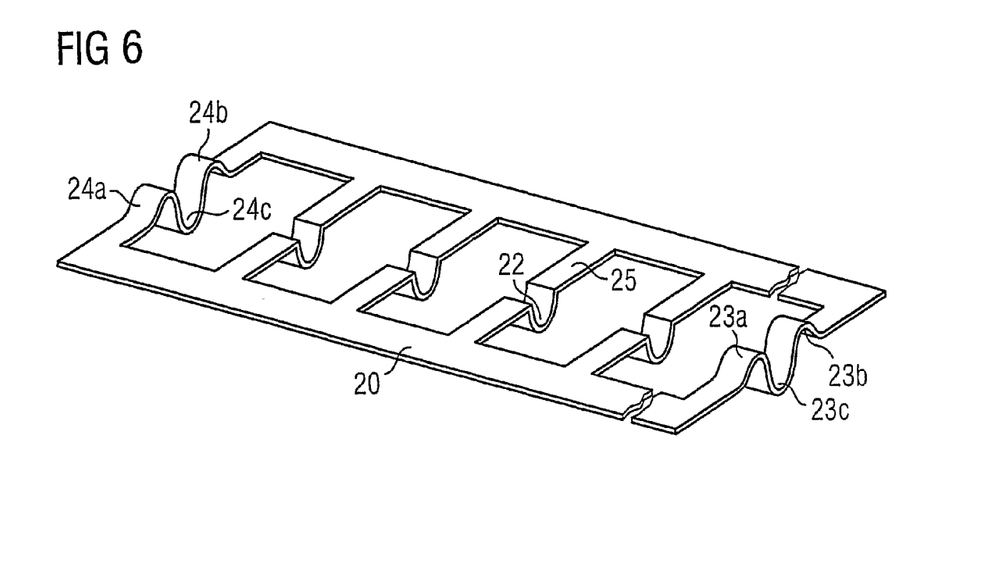
FIG. 6 illustrates an alternative configuration of a mount for positioning the protective element in the device.

The mount 20 is embodied as a multiply perforated covering of the lower part 31 of the reflector 30. The mount 20 comprises webs with bearing areas 21 that span the cavity of the lower part of the housing and is supported by the lower part of the housing. The webs run from one side to the other side of the open cavity. Their bearing areas 21 are embodied as depressions in the webs into which the shrinkable protective element can be inserted such that it is positioned in a positionally correct manner. The mount 20 is for example fixed by means of screws to the lower part of the housing or else inserted loosely into a depression provided in the lower part of the housing. The mount 20 can at any rate be detached from the lower part of the housing in order to obtain access to the heating element 10. The mount will furthermore be described in detail in FIG. 6.

The heating element 10 is surrounded by the reflector 30, arranged in the lower part of the housing and, in this exemplary embodiment, extends in the longitudinal direction L over the entire length of the reflector 30. The heating element 10 can be removed from the lower part of the housing. The reflective area 301 of the reflector 30 can be cleaned more easily as a result. FIG. 1 illustrates the housing 30 in cut-away fashion on the left-hand side of the lower part in order to allow a view of the interior of the housing and the reflector.

The heating element 10 is supplied with electrical power by a power source 50, for example a battery or an accumulator. The device may contain a switch for connecting the heating element 10 to a power source, which switch is embodied in such a way that it can be actuated by closing the cover of the housing. When the housing is closed, the power supply for the heating element 10 is switched on. The switching-on operation takes place directly and automatically as a result of the closing operation. For this purpose, a switch can be actuated by the closing operation of the cover and turns on when the housing is closed. The heating operation for the heating element and the initiation of shrinking for the protective element are thereby effected automatically as a result of the closing of the cover 32.

The device furthermore comprises a cooling fan 70 for generating an air stream around the protective element 101 in order to dissipate heat from the protective element 101. The air stream generated by the cooling fan 70 flows through the reflector 30 in the longitudinal direction L.

Like the heating element 10, the cooling fan 70 is concomitantly incorporated together in the lower part of the housing and connected there to a power source, with the result that only one line routing is necessary in the lower part of the housing.

Figure 2:
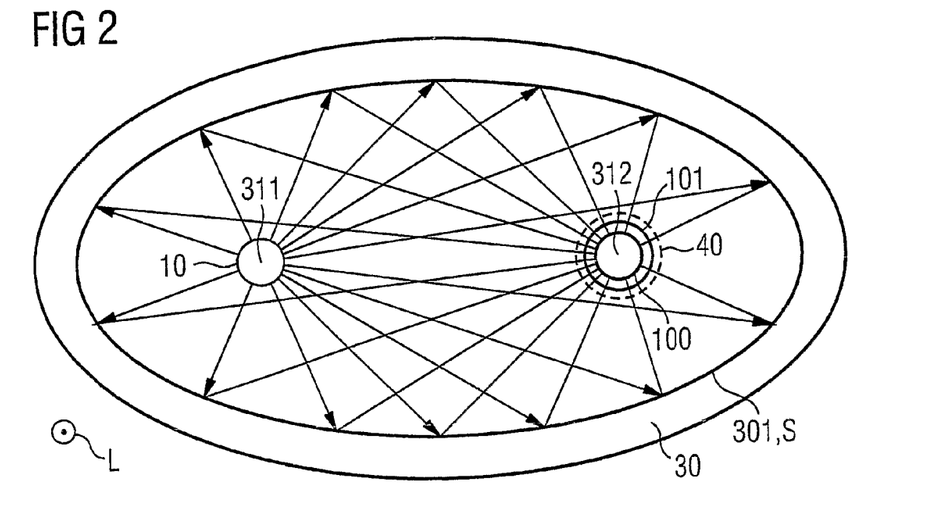
FIG. 2 shows an exemplary embodiment of a preferred geometry of the reflector of the device according to the invention.

FIG. 2 illustrates a particular configuration for the reflector 30. The reflector 30 extends in the longitudinal direction L of FIG. 1, which is perpendicular to the plane of the drawing in FIG. 2. FIG. 2 illustrates a sectional view of the reflector that is considered in the longitudinal direction L if first and second parts 31, 32 of the reflector are closed. The reflective area 301 of the reflector has the same cross section illustrated over the entire length of the reflector 30 in the longitudinal direction L. In the particularly preferred exemplary embodiment of FIG. 2, the cross section has the form of an ellipse with a first focal point and a second focal point. The first and second focal points of the ellipses define first and second focus zones 311 and 312 extending in the longitudinal direction L. The heating element 10 is arranged in the first focus zone 311 and the protective element 101 held by the mount is arranged in the second focus zone. The heating element 10 emits thermal radiation with uniform intensity in each of the radial directions perpendicular to the focus zone 311. The elliptical form of the cross section of the reflective area 301 ensures that the thermal radiation emitted in the radial direction by the heating element 10 extending along the first focus zone 311 is focused onto the protective element 101 extending along the second focus zone 312. The material of the reflective area 301 is chosen such that a largest possible proportion of the thermal radiation emitted by the heating element 10 is reflected at the reflector 30 and a smallest possible proportion is absorbed. In the geometrical sense, the reflector 30 is a body which is formed in translationally symmetrical fashion and the base area of which is an ellipse. The inner side of the reflector formed by translational displacement of the ellipse is preferably coated with gold.

Figure 3:
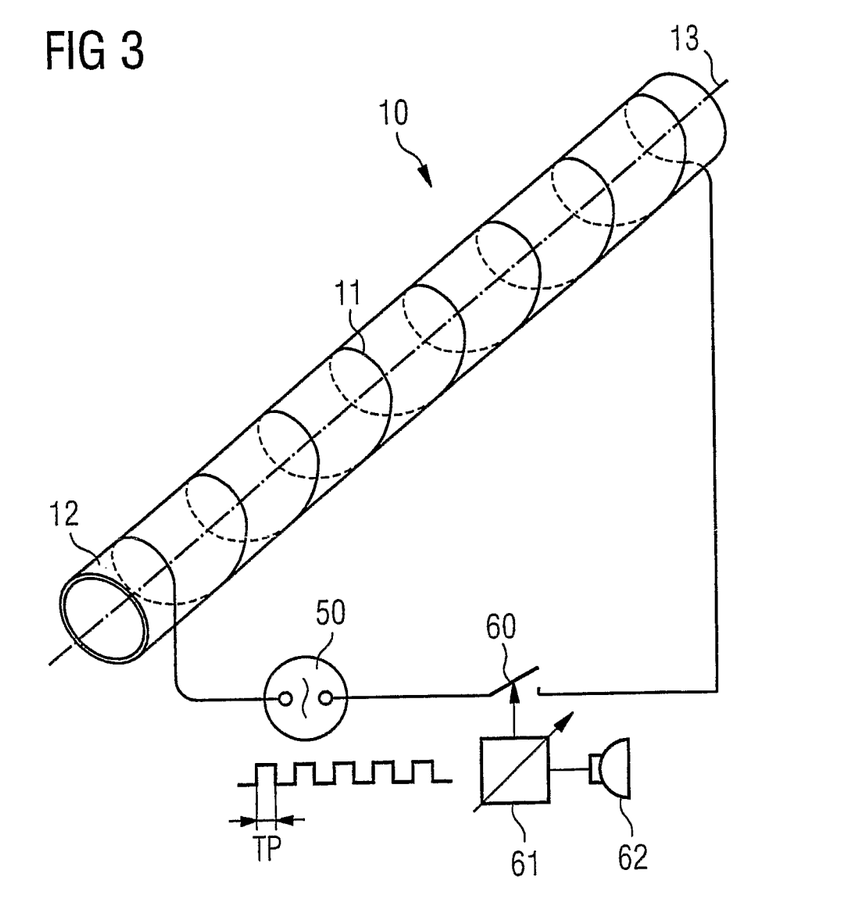
FIG. 3 shows an exemplary embodiment of a preferred heating element of the device according to the invention.

FIG. 3 illustrates a configuration of the heating element 10 in greater detail. In this configuration, the heating element 10 comprises a wire 11, to which a voltage generated by the power source 50 can be applied via the switch 60. The wire 11 is an ohmic resistor that takes up electrical power and emits the latter again predominantly as thermal radiation. The wire 11 preferably contains an alloy formed or comprising iron, nickel and aluminum, for example Kanthal A, which is designed for emitting a high spectral portion of the emitted radiation in the infrared range. The spectral distribution of the thermal radiation emitted by the wire 11, and in particular the wavelength with the highest spectral intensity, can be controlled by way of the current intensity of the electric current flowing in the wire 11 and thus by suitable choice of the electrical resistance of the wire 11 and the voltage applied to the wire 11. The electrical resistance of the wire 11 depends on the resistivity of the material used for the wire, the area of the cross section and the length. In order to obtain a thermal radiation having a high spectral portion in the infrared range for a given resistivity and a given voltage, it may be expedient to increase the resistance by decreasing the cross section of the wire 11 and increasing the length of the wire 11. The long and thin wire 11 is therefore wound as a coil onto a carrier element 12. The carrier element 12 is formed for example from a ceramic having a high temperature stability.

The switch 60 can be switched off in a time-controlled manner. By way of example, a settable time-controllable element 61 is provided, which keeps the switch 60 closed for a specific time predetermined in settable fashion. After the time has elapsed, the heating operation is interrupted. The elapsing of the time or the end of the shrinking operation is then indicated to the user of the apparatus acoustically by means of a loudspeaker 62. As an alternative to a loudspeaker, an optical indication in the form of a light-emitting diode may be provided. The power source 50, for its part, may be embodied such that it supplies power that varies in settable fashion. The radiated thermal energy can thereby be set. The average electric current supplied by the power source 50 can be set correspondingly, for example by the current being provided as a sequence of current pulses whose pulse width TP is set according to the desired average current. The pulse width is modulated in accordance with the desired average current and the desired power.

It is possible for both the pulse width TP and the heating time which can be set by the actuating element 60 to be provided for example by a splicer. The splicer conventionally has a processor that runs an operating system, such as a personal computer for example. The corresponding predetermined values for the thermal energy to be transferred to the shrinkable sleeve and also the heating time can be defined there and be transferred to the heating device by means of a connecting cable for example.

The mount 20 serves for orienting the shrinkable sleeve to one of the focal points of the translational ellipse of the reflector 30. The mount 20 is formed for example from a metal sheet having webs 25 that are formed by a stamping operation and lie above the cavity forming the reflector 30. The depressions 20 in which the shrinkable sleeve is located are impressed at the location of the ellipse focal point. In order furthermore to improve the orientation, it is possible, as illustrated, for the edge-side webs 23, 24 to have depressions 23c, 24c directed in the direction of the heating element. Projecting elevations 23a, 23b and 24a, 24b may be provided in a manner outwardly adjoining the depressions 23c, 24c, respectively. It goes without saying that it is also possible for a different one of the webs or all of the webs to be embodied like the webs illustrated in outer locations in FIG. 6.

For the purpose of orienting the shrinkable sleeve or the optical waveguide, as illustrated in FIG. 1, an end plate—arranged on the longitudinal side—of the cavity forming the reflector is furthermore equipped with respective projections 34a, 34b and 35a, 35b. The projections are arranged in a spaced-apart manner on the end plates, such that the optical waveguide can be inserted between them. For orientation it suffices for only one projection to be provided at a plate, for example projection 34a, projection 34b being obviated. The diametrically opposite projection 35b may correspondingly be present at the other plate, the projection 35a being obviated. In principle, it is also possible for all the projections 34a, 34b, 35a, 35b to be obviated, in which case, rather, the outer webs 23, 24 of the holding element 20 should then be configured with projections 23a, 23b, 24a, 24b, so that the shrinkable sleeve and the optical waveguide are reliably oriented to the focus region of the ellipse.

Figure 7:
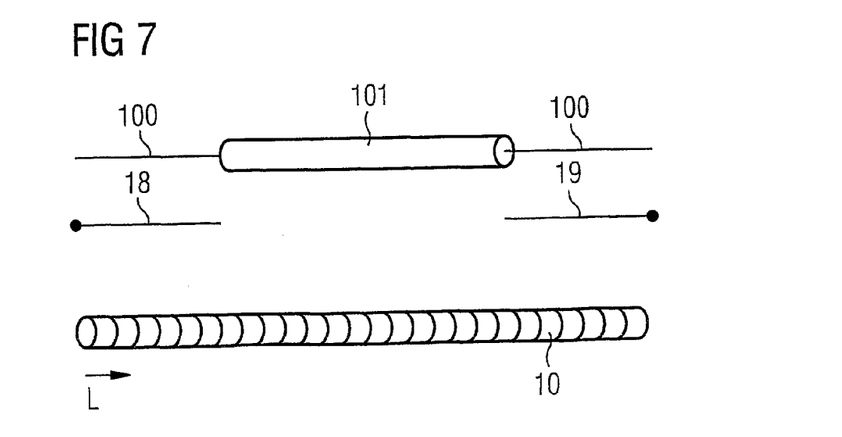
FIG. 7 shows a schematic side view of the device with a covering for the thermal radiation.

Finally, FIG. 7 shows a schematic side view of the shrinkable sleeve 101, the optical waveguide 100 to be protected by means of the shrinkable sleeve, and also the heating element 10. For the case where the shrinkable sleeve 101 is shorter than the heating element 10, covering elements 18, 19 are provided which are arranged between the heating element 10 and the uncovered sections of the optical waveguide 100. The heat radiated by the heating element 10 is shielded from the uncovered sections of the optical waveguide 100, which are not covered by the shrinkable sleeve 101, by the covering elements 18, 19. The length of the covering devices 18, 19 can be varied by means of an actuating mechanism. This may be effected by means of a rolling-up mechanism for example. On the other hand, the holding element 20 can be removed from the reflector by removal of the screws, and suitable covering elements 18, 19 that are adapted in terms of their length to the length of the shrinkable sleeve can then be inserted into the lower part 31 of the reflector.

Figure 4A:
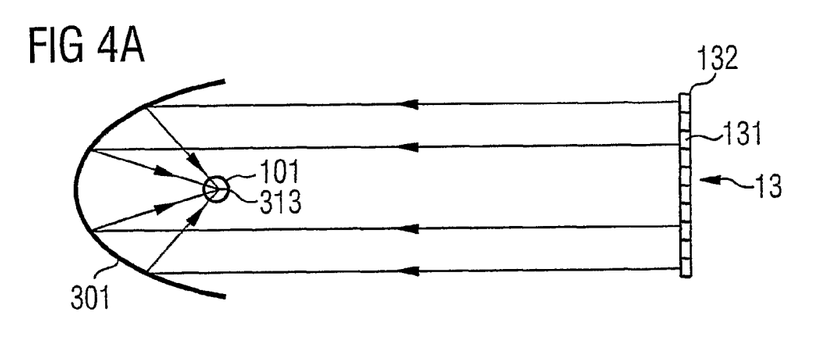
FIGS. 4A to 4C show further exemplary embodiments of a preferred geometry of the reflector and a preferred heating element.
Figure 4B:
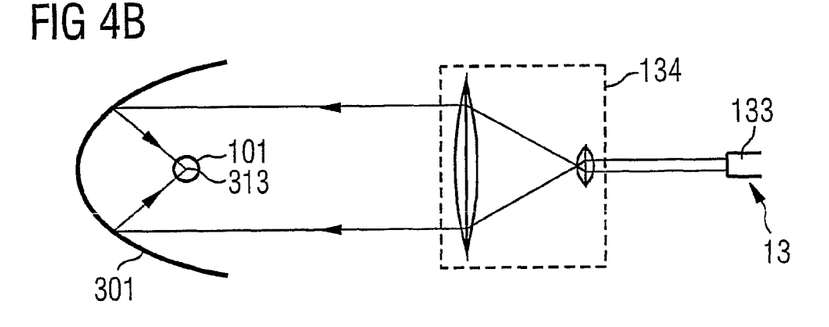
Figure 4C:
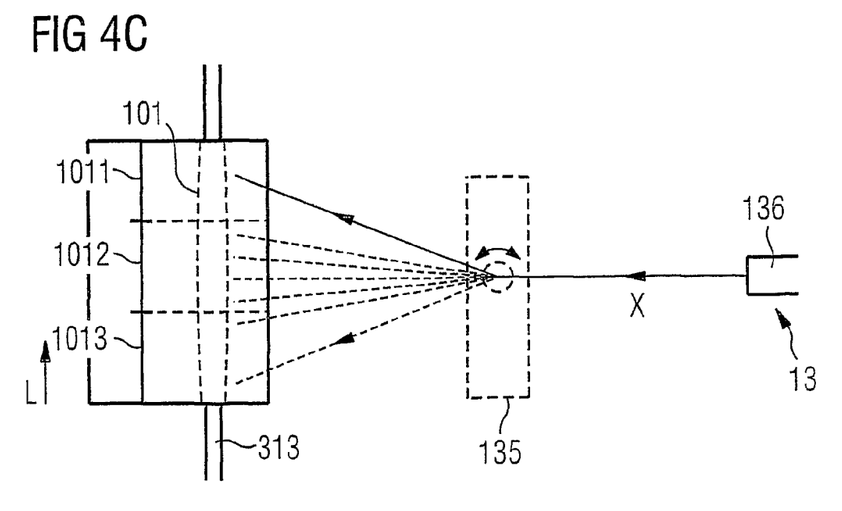

FIGS. 4A to 4C illustrate exemplary embodiments of the device according to the invention which in each case have a parabolic reflector 30 with a focus zone 313. The reflective area 301 of the reflector 30 has, over the entire length of the reflector 30, cross sections in the form of parabolas that are situated transversely with respect to the longitudinal direction L. One of the parabolas in each case has a focal point. The focal points of the parabolas define the focus zone 313 of the reflector, which extends in the longitudinal direction L.

FIG. 4A additionally shows a radiator 13, which emits thermal radiation predominantly in a preferred direction X. The radiator 13 may comprise for example an infrared-light-emitting diode 131, an entire array of infrared-light-emitting diodes 132 which extends in the longitudinal direction L, a semiconductor laser or else a halogen lamp.

FIG. 4B illustrates a configuration in which the radiator 13 comprises the semiconductor laser 133. An optical arrangement 134 for expanding the beam generated by the radiator 13 is additionally provided. The laser beam generated by the semiconductor laser 133 is expanded by the optical arrangement 134 to form a radiation bundle having the diameter D. The diameter is chosen for example such that it corresponds to the dimension of the protective element 101 in the longitudinal direction L. The parabolic reflector 30 focuses the radiation bundle having the diameter D in a plane perpendicular to the longitudinal direction L onto a protective element 101 extending along the focus zone 313.

FIG. 4C shows a configuration in which an optical arrangement 135 for deflecting a beam generated by the radiator 13 is provided. The optical arrangement 135 or at least one component of the optical arrangement 135 oscillates for example in the longitudinal direction L or about a direction perpendicular to the longitudinal direction L and the direction of the beam generated by the radiator 13, in order to distribute the intensity of the thermal radiation over the focus zone extending in the longitudinal direction L.

Figure 5A:
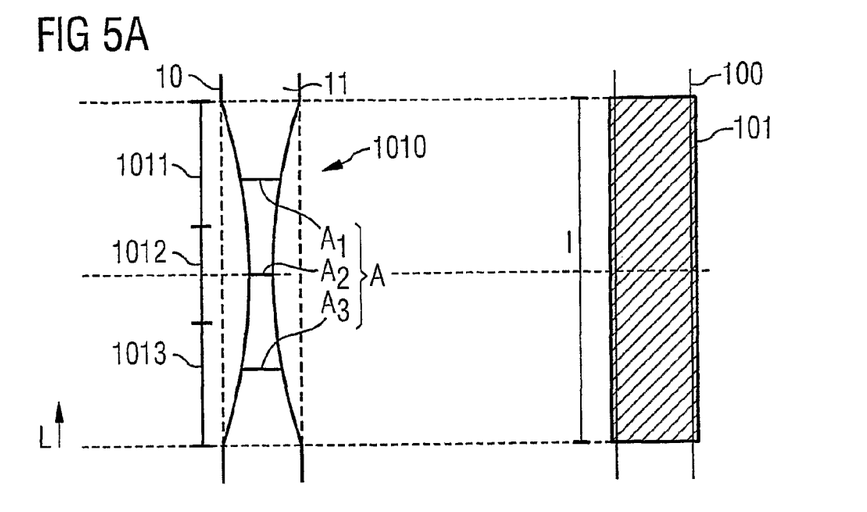
FIGS. 5A to 5C show further exemplary embodiments of preferred heating elements.

FIG. 5A illustrates the heating element 10 in a preferred configuration of the invention. A longitudinal section 1010 of the heating element 10 is arranged opposite a protective element 101 having the length 1, which surrounds an optical waveguide 100 extending in the longitudinal direction L. The heating element 10 comprises a wire 11 extending in the longitudinal direction L. The respective cross-sectional area A of the wire 11 has a tapering 111 between ends of the longitudinal section 1010 of the heating element 10. Cross-sectional areas $A_1, A_2, A_3$ present at different locations of the longitudinal section 1010 are smaller in a central region 1012 of the longitudinal section 1010 and increase outwardly into the outer region 1011, 1013 adjoining the central region. At the tapering 111, the current density of the electric current and the resultant heating and radiation emission in the central region 1012 are increased. The energy density in the focus region of the shrinkable sleeve and the optical waveguide is increased in the center thereof and lower in the outer sections.

Figure 5B:
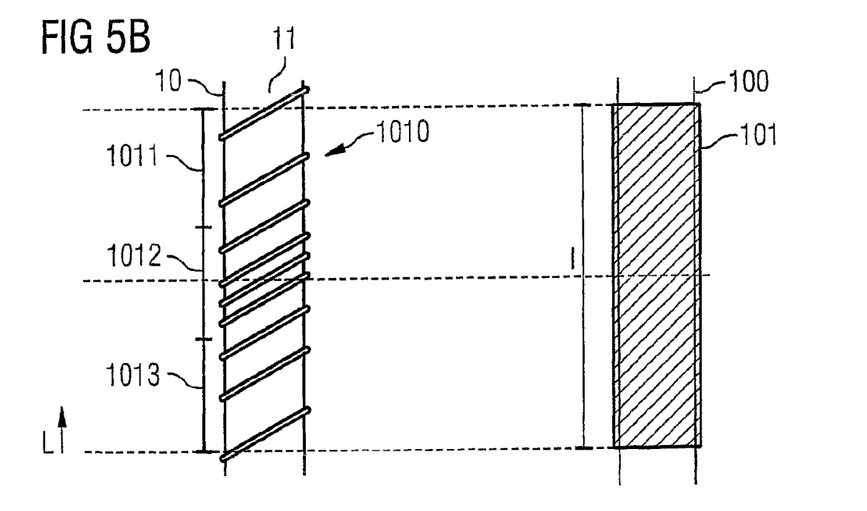

FIG. 5B illustrates the heating element 10 in another preferred configuration. A longitudinal section 1010 of the heating element 10 is arranged opposite a protective element 101 having the length l, which surrounds an optical waveguide 100 extending in the longitudinal direction L. The heating element 10 comprises a wire 11 wound in the form of a helix around a ceramic body 12 extending in the longitudinal direction L. The pitch of the helix 112 is lower in a central region 1012 of the longitudinal section 1010 of the heating element 10. The helix is wound more densely in the central region than in the outer regions. Therefore, more turns per length are situated in the central region 1012 than in the outer regions 1011, 1013 adjoining it. The quantity of heat radiated per length section of the heating element 10 is increased in the central region 1012 relative to the outer regions 1011, 1013.

Referring to the oscillating optical arrangement 135 described in connection with FIG. 4C, a point of impingement 1311 of the beam bundle 131 moves along the protective element 101 as a function of time. The average residence duration of the point of impingement of the beam bundle 131 at a location of the protective element corresponds to the magnitude of the reciprocal speed of the point of impingement.

Figure 5C:
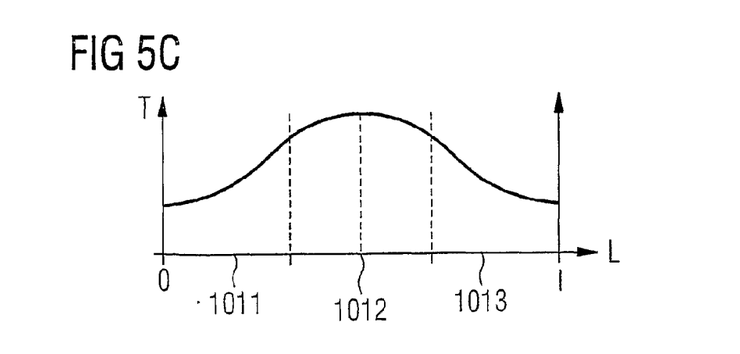

FIG. 5C illustrates a distribution of temperature along the protective element that results in the case of a suitable time profile of the oscillation. The residence duration of the point of impingement of the beam bundle is increased in a central region 1012 of the protective element 101, said central region being arranged between the end regions 1011 and 1013 in the longitudinal direction L. As a result, the average temperature of the protective element 101 is also higher in the central region 1012 than in the end regions 1011 and 1013.

What is common to the configurations described with reference to FIG. 4C and FIGS. 5A to 5C is that a central region 1012 of the protective element in the longitudinal direction L is exposed to an increased radiation power, with the result that the temperature rises more rapidly in this region than outside this region. The temperature necessary for the commencement of the shrinking process is therefore reached firstly in this region and only then at regions located further outward.

In this way, the protective element is shrunk on in the longitudinal direction beginning from the center outwardly, so that air surrounded by the protective element is not included during the shrinking-on process, but rather is transported away from the central region 1012 of the protective element outwardly. Air inclusions in the protective element are thereby avoided by virtue of the protective element being shrunk onto the optical waveguide situated therein from the center outwardly. The included air is thereby removed automatically from the shrinking protective element from the inside outwardly.

What is suitable as a further configuration of the heating element is a coil-shaped wire wound as a helix, in which the wire has a smaller diameter in the central region of the heating element than outside. It is furthermore conceivable to use a wire wound as a coil, in which case the coil has a smaller coil diameter in the central region and thereby lies nearer in the focal line of the translational ellipse and has a larger coil diameter in the outer region of the heating element and thereby lies slightly outside the focal point of the ellipse and thereby generates a less well focused evolution of heat.

What is claimed is:

1. A device for fitting a protective element shrinkable by supply of heat onto an optical waveguide, comprising:
    a housing comprising an upper part and a lower part that together form an enclosure through which the optical waveguide extends;
    a heating element within the enclosure, adapted to emit thermal radiation, a mount that supports the protective element along a longitudinally extending holding location between the upper part and the lower part of the housing; and
    a reflector having an arcuate first part carried by the upper part of the housing and an arcuate second part carried by the lower part of the housing, the reflector reflects the radiation emitted by the heating element onto the protective element;
    wherein the arcuate first part of the reflector and the arcuate second part of the reflector together form an arcuate cross-sectional shape with the upper part and lower part of the housing in a closed configuration and one of the arcuate first part and arcuate second part forming a smaller portion of the arcuate cross-sectional shape than the other of the arcuate first part and the arcuate second part.

2. The device as claimed in claim 1, in which the longitudinally extending holding location extends in a longitudinal direction (L), the heating element extends in a manner running parallel to the longitudinally extending holding location in the longitudinal direction (L).

3. The device as claimed in claim 2, wherein the arcuate cross-sectional shape is a closed elliptical cross-sectional shape, the longitudinally extending holding location of the mount is located at a first focal point of the elliptical cross-sectional shape.

4. The device as claimed in claim 3, in which the heating element is located at a second focal point of the elliptical cross-sectional shape.

5. The device as claimed in claim 1, in which the heating element comprises a wire made of an electrically conductive material that emits thermal radiation on account of electric current flow.

6. The device as claimed in claim 5, in which the heating element has a longitudinal section lying opposite the mount and having outer sections and a central section arranged in between, and a cross-sectional area (A) of the wire in the central section is smaller than a cross-sectional area in one of the outer sections.

7. The device as claimed in claim 5, in which the wire is formed with a smaller cross section (A) in a central section than in one of the outer sections.

8. The device as claimed in claim 5, in which the wire contains a metal or a metallic alloy.

9. The device as claimed in claim 5, in which the wire contains an alloy comprising iron, nickel and aluminum.

10. The device as claimed in claim 5, in which the wire is coiled in the form of a helix.

11. The device as claimed in claim 10, in which the heating element has a longitudinal section lying opposite the mount and having outer sections and a central section arranged in between, the helix having more turns within a predetermined length in the central section than within the predetermined length in one of the outer sections.

12. The device as claimed in claim 11, in which the heating element contains a carrier element and the wire is wound as a coil onto the carrier element (12).

13. The device as claimed in claim 12, in which the carrier element is formed from ceramic.

14. The device as claimed in claim 1, in which the arcuate first part and the arcuate second part of the reflector are movable relative to one another.

15. The device as claimed in claim 14, in which the arcuate first part is connected to the arcuate second part via a hinge, such that the arcuate first part of the reflector can be swung open relative to the arcuate second part.

16. The device as claimed in claim 14, in which the arcuate first part can be detached from the arcuate second part.

17. The device as claimed in claim 1, in which the heating element is arranged in the arcuate first part of the reflector and is removable from the arcuate first part.

18. The device as claimed in claim 1, comprising a cooling fan for generating an air stream around the protective element.

19. The device as claimed in claim 1, in which the mount has bearing sections that receive the protective element.

20. The device as claimed in claim 1, in which the heating element comprises a radiator, which emits the thermal radiation predominantly in a preferred direction.

21. The device as claimed in claim 20, in which the radiator comprises an infrared-light-emitting diode.

22. The device as claimed in claim 20, in which the radiator comprises an array of infrared-light-emitting diodes.

23. The device as claimed in claim 20, in which the radiator comprises a semiconductor laser.

24. The device as claimed in claim 23, additionally comprising an optical arrangement for expanding a beam bundle of the thermal radiation emitted by the radiator.

25. A device for fitting a protective element shrinkable by supply of heat onto an optical waveguide, the device comprising:
a housing including an upper part having a first reflective surface forming an upper cavity and a lower part having a second reflective surface forming a lower cavity;
a heating element within the housing adapted to emit thermal radiation; and
a mount having a holding location extending longitudinally within the housing formed by at least one bearing section that spans the lower cavity to support the protective element and the optical waveguide thereon;
wherein the mount has the holding location extending longitudinally within the housing formed by multiple bearing sections, each bearing section comprising a depression that spans the lower cavity to support the protective element and the optical waveguide thereon.

26. The device as claimed in claim 25, additionally comprising an optical arrangement that deflects a beam bundle of the thermal radiation emitted by the heating element.

27. The device as claimed in claim 26, in which a residence duration of the beam bundle is higher in a central region of the protective element than in end regions of the protective element.

28. The device as claimed in claim 25 further comprising a covering device arranged between the heating element and the optical waveguide and shields the optical waveguide from thermal radiation emitted by the heating element during operation.

29. The device as claimed in claim 28, in which the covering device has a variable longitudinal extent in the longitudinal direction (L).

* * * * *